US010885005B2

(12) United States Patent
Petculescu et al.

(10) Patent No.: US 10,885,005 B2
(45) Date of Patent: *Jan. 5, 2021

(54) DISK OPTIMIZED PAGING FOR COLUMN ORIENTED DATABASES

(71) Applicant: MICROSOFT TECHNOLOGY LICENSING, LLC, Redmond, WA (US)

(72) Inventors: Cristian Petculescu, Seattle, WA (US); Amir Netz, Bellevue, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 269 days.

This patent is subject to a terminal disclaimer.

(21) Appl. No.: 15/925,216

(22) Filed: Mar. 19, 2018

(65) Prior Publication Data

US 2018/0253456 A1 Sep. 6, 2018

Related U.S. Application Data

(63) Continuation of application No. 15/137,827, filed on Apr. 25, 2016, now Pat. No. 9,922,060, which is a (Continued)

(51) Int. Cl.
*G06F 7/00* (2006.01)
*G06F 16/22* (2019.01)
(Continued)

(52) U.S. Cl.
CPC .......... *G06F 16/221* (2019.01); *G06F 16/16* (2019.01); *G06F 16/182* (2019.01)

(58) Field of Classification Search
CPC ....... G06F 16/221; G06F 16/182; G06F 16/16
(Continued)

(56) References Cited

U.S. PATENT DOCUMENTS 5,809,516 A 9/1998 Ukai et al.
6,028,539 A 2/2000 Matsui
(Continued)

FOREIGN PATENT DOCUMENTS

| CN | 102867046 A | 1/2013 |
| EP | 2555129 A1 | 2/2013 |
| JP | 2014199581 A | 10/2014 |

OTHER PUBLICATIONS

"Basic RAID Organizations", http://www.ecs.umass.edu/ece/koren/architecture/Raid/basicRAID.html, Sep. 20, 2000, 4 Pages.
(Continued)

*Primary Examiner* — Isaac M Woo
(74) *Attorney, Agent, or Firm* — Workman Nydegger

(57) ABSTRACT

Implementing a database system using a plurality of sequentially ordered drives to store sequential portions of columns of the database, but where the database system is usable by a system configured for use with in-memory database systems. The method includes loading one or more columns of a database into main memory of a computing system as a table based database. The method further includes dividing a column of the database into sequential portions. Each of the sequential portions is of sufficient size to create efficient transfers using hard disk controllers to transfer an entire sequential portion. The method further includes writing each of the sequential portions sequentially onto sequentially ordered drives in a round robin fashion such that sequential portions of the column are on sequential drives.

9 Claims, 4 Drawing Sheets

Related U.S. Application Data continuation of application No. 14/144,374, filed on Dec. 30, 2013, now Pat. No. 9,430,508.

(51) Int. Cl.
  *G06F 16/16*   (2019.01)
  *G06F 16/182*  (2019.01)

(58) Field of Classification Search
  USPC .................................................. 707/600–899
  See application file for complete search history.

(56) References Cited

U.S. PATENT DOCUMENTS

| | | | |
|---|---|---|---|
| 6,175,906 B1 | 1/2001 | Christie | |
| 6,189,094 B1 | 2/2001 | Hinds et al. | |
| 6,625,763 B1 * | 9/2003 | Boner | H03M 13/2703 341/81 |
| 6,629,314 B1 | 9/2003 | Wu | |
| 6,662,268 B1 | 12/2003 | McBrearty et al. | |
| 6,701,420 B1 | 3/2004 | Hamilton et al. | |
| 6,741,983 B1 | 5/2004 | Birdwell et al. | |
| 7,352,390 B2 | 4/2008 | Gonzalez | |
| 7,467,169 B2 | 12/2008 | Gole et al. | |
| 7,617,184 B2 | 11/2009 | Ferrari et al. | |
| 7,818,349 B2 | 10/2010 | Frost | |
| 7,827,279 B2 | 11/2010 | Xu et al. | |
| 7,921,142 B2 | 4/2011 | Chang et al. | |
| 8,139,593 B2 | 3/2012 | Dravida et al. | |
| 8,156,107 B2 | 4/2012 | Bawa et al. | |
| 8,312,037 B1 | 11/2012 | Bacthavachalu et al. | |
| 8,312,039 B2 | 11/2012 | Gilula | |
| 8,489,817 B2 | 7/2013 | Flynn et al. | |
| 9,049,145 B2 | 6/2015 | Li et al. | |
| 9,723,054 B2 | 8/2017 | Petculescu et al. | |
| 9,898,398 B2 | 2/2018 | Petculescu et al. | |
| 2002/0069317 A1 | 6/2002 | Chow et al. | |
| 2004/0078622 A1 | 4/2004 | Kaminsky et al. | |
| 2004/0122845 A1 | 6/2004 | Lohman et al. | |
| 2005/0102613 A1 | 5/2005 | Boukouvalas et al. | |
| 2007/0186065 A1 | 8/2007 | Lee et al. | |
| 2008/0052469 A1 | 2/2008 | Fontenot et al. | |
| 2009/0254774 A1 | 10/2009 | Chamdani et al. | |
| 2010/0180095 A1 | 7/2010 | Fujibayashi et al. | |
| 2011/0072197 A1 | 3/2011 | Lund et al. | |
| 2011/0072437 A1 | 3/2011 | Druyan | |
| 2011/0082983 A1 | 4/2011 | Koktan | |
| 2011/0191522 A1 | 8/2011 | Condict et al. | |
| 2011/0320733 A1 | 12/2011 | Sanford et al. | |
| 2012/0072652 A1 | 3/2012 | Cells et al. | |
| 2012/0110538 A1 | 5/2012 | Shih et al. | |
| 2012/0131126 A1 | 5/2012 | Bandyopadhyay et al. | |
| 2012/0150527 A1 | 6/2012 | Creedon et al. | |
| 2013/0019057 A1 | 1/2013 | Stephens | |
| 2014/0082293 A1 | 3/2014 | Alexander et al. | |
| 2014/0108421 A1 | 4/2014 | Isaacson et al. | |
| 2014/0325145 A1 | 10/2014 | Sampathkumar | |
| 2015/0186410 A1 | 7/2015 | Petculescu et al. | |
| 2015/0188978 A1 | 7/2015 | Petculescu et al. | |
| 2016/0239513 A1 | 8/2016 | Petculescu et al. | |
| 2017/0324801 A1 | 11/2017 | Petculescu et al. | |

OTHER PUBLICATIONS

"Buffer Pool Extension", http://technet.microsoft.com/en-us/library/dn133176(v=sql.120).aspx, Jun. 13, 2017, 7 Pages.

"Disk Configuration for Sequential Scans", http://www.ixora.com.au/tips/creation/sequential_reads.htm, Jan. 25, 2000, 2 Pages.

"Final Office Action Issued in U.S. Appl. No. 14/144,355", dated Jun. 6, 2016, 21 Pages.

"Non-Final Office Action Issued in U.S. Appl. No. 14/144,355", dated Nov. 20, 2015, 19 Pages.

"Non Final Office Action Issued in U.S. Appl. No. 14/144,374", dated Oct. 9, 2015, 7 Pages.

"Final Office Action Issued in U.S. Appl. No. 14/144,418", dated Apr. 7, 2016, 20 Pages.

"Final Office Action issued in U.S. Appl. No. 14/144,418", dated Mar. 13, 2017, 24 Pages.

"Non Final Office Action Issued in U.S. Appl. No. 14/144,418", dated Aug. 26, 2016, 22 Pages.

"Non-Final Office Action Issued in U.S. Appl. No. 14/144,418", dated Sep. 16, 2015, 18 Pages.

"Non Final Office Action Issued in U.S. Appl. No. 15/137,827", dated Jan. 20, 2017, 6 Pages.

"Non Final Office Action Issued in U.S. Appl. No. 15/137,827", dated Apr. 17, 2017, 9 pages.

"Non Final Office Action Issued in U.S. Appl. No. 15/659,305", dated May 3, 2018, 30 Pages.

"Non Final Office Action Issued in U.S. Appl. No. 15/870,204", dated Jul. 12, 2018, 21 Pages.

Canim, et al., "SSD Bufferpool Extensions for Database Systems", In Proceedings of the VLDB Endowment, vol. 3, Issue 1-2, Sep. 13, 2010, 12 Pages.

Chen, et al., "Essential Roles of Exploiting Internal Parallelism of Flash Memory based Solid State Drives in High-Speed Data Processing", In Proceedings of IEEE 17th International Symposium on High Performance Computer Architecture, Feb. 12, 2011, 12 Pages.

Do, et al., "Turbocharging DBMS Buffer Pool Using SSDs", In Proceedings of the International Conference on Management of Data, Jun. 12, 2011, 12 Pages.

Holloway, Allison L., "Adapting Database Storage for New Hardware", In the Doctoral Dissertation, Oct. 11, 2013, 146 Pages.

Klein, et al., "A Scalable Distributed Architecture for Network- and QoS-aware Service Composition", In Proceedings of Joint Agent-oriented Workshops in Synergy, Sep. 9, 2012, 8 Pages.

"International Preliminary Report on Patentability Issued in PCT Application No. PCT/US2014/071777", dated Feb. 17, 2016, 7 Pages.

"International Search Report & Written Opinion for PCT Application No. PCT/US2014/071777", dated Mar. 31, 2015, 9 Pages.

"Second Written Opinion Issued in PCT Application No. PCT/US2014/071777", dated Nov. 19, 2015, 6 Pages.

Rahm, et al., "Analysis of Parallel Scan Processing in Shared Disk Database Systems", In Proceedings of First International Euro-Par Conference of Parallel Processing, Aug. 29, 1995, 14 Pages.

"Final Office Action Issued in U.S. Appl. No. 15/870,204", dated Jan. 28, 2019, 8 Pages.

\* cited by examiner

DISK OPTIMIZED PAGING FOR COLUMN ORIENTED DATABASES

CROSS-REFERENCE TO RELATED APPLICATIONS

This application is a continuation of U.S. patent application Ser. No. 15/137,827, filed Apr. 25, 2016, entitled "DISK OPTIMIZED PAGING FOR COLUMN ORIENTED DATABASES", which is a continuation of Ser. No. 14/144,374 filed on Dec. 30, 2013, entitled "DISK OPTIMIZED PAGING FOR COLUMN ORIENTED DATABASES," which issued as U.S. Pat. No. 9,330,126 on May 3, 2016, and which application is expressly incorporated herein by reference in its entirety.

BACKGROUND

Background and Relevant Art

Computers and computing systems have affected nearly every aspect of modern living. Computers are generally involved in work, recreation, healthcare, transportation, entertainment, household management, etc.

Further, computing system functionality can be enhanced by a computing systems ability to be interconnected to other computing systems via network connections. Network connections may include, but are not limited to, connections via wired or wireless Ethernet, cellular connections, or even computer to computer connections through serial, parallel, USB, or other connections. The connections allow a computing system to access services at other computing systems and to quickly and efficiently receive application data from other computing system.

Interconnection of computing systems has facilitated distributed computing systems, such as so-called "cloud" computing systems. In this description, "cloud computing" may be systems or resources for enabling ubiquitous, convenient, on-demand network access to a shared pool of configurable computing resources (e.g., networks, servers, storage, applications, services, etc.) that can be provisioned and released with reduced management effort or service provider interaction. A cloud model can be composed of various characteristics (e.g., on-demand self-service, broad network access, resource pooling, rapid elasticity, measured service, etc), service models (e.g., Software as a Service ("SaaS"), Platform as a Service ("PaaS"), Infrastructure as a Service ("IaaS"), and deployment models (e.g., private cloud, community cloud, public cloud, hybrid cloud, etc.).

Cloud and remote based service applications are prevalent. Such applications are hosted on public and private remote systems such as clouds and usually offer a set of web based services for communicating back and forth with clients.

Some such systems implement distributed database systems. However, some of these distributed database systems, such as Microsoft Analysis Services available from Microsoft Corporation of Redmond, Wash., implemented in tabular mode require all data in the database to be loaded into main memory. However, in many current systems, this limits the size of the database to 120 GB. To expand the size of the database, a hard drive may be used. However, this comes with a performance hit. In particular, a naïve memory-mapped file or paging file approach will have, even on SSDs, a performance degradation of 3 orders of magnitude, as the IOs are too small and not numerous enough to pose a significant enough load on the SSD controller.

The subject matter claimed herein is not limited to embodiments that solve any disadvantages or that operate only in environments such as those described above. Rather, this background is only provided to illustrate one exemplary technology area where some embodiments described herein may be practiced.

BRIEF SUMMARY

One embodiment illustrated herein includes a method that may be practiced in a computing environment. The method includes acts for implementing a database system using a plurality of sequentially ordered drives to store sequential portions of columns of the database, but where the database system is usable by a system configured for use with in-memory database systems. The method includes loading one or more columns of a database into main memory of a computing system as a table based database. The method further includes dividing a column of the database into sequential portions. Each of the sequential portions is of sufficient size to create efficient transfers using hard disk controllers to transfer an entire sequential portion. The method further includes writing each of the sequential portions sequentially onto sequentially ordered drives in a round robin fashion such that sequential portions of the column are on sequential drives.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Additional features and advantages will be set forth in the description which follows, and in part will be obvious from the description, or may be learned by the practice of the teachings herein. Features and advantages of the invention may be realized and obtained by means of the instruments and combinations particularly pointed out in the appended claims. Features of the present invention will become more fully apparent from the following description and appended claims, or may be learned by the practice of the invention as set forth hereinafter.

BRIEF DESCRIPTION OF THE DRAWINGS

In order to describe the manner in which the above-recited and other advantages and features can be obtained, a more particular description of the subject matter briefly described above will be rendered by reference to specific embodiments which are illustrated in the appended drawings. Understanding that these drawings depict only typical embodiments and are not therefore to be considered to be limiting in scope, embodiments will be described and explained with additional specificity and detail through the use of the accompanying drawings in which.

DETAILED DESCRIPTION

Figure 1A:
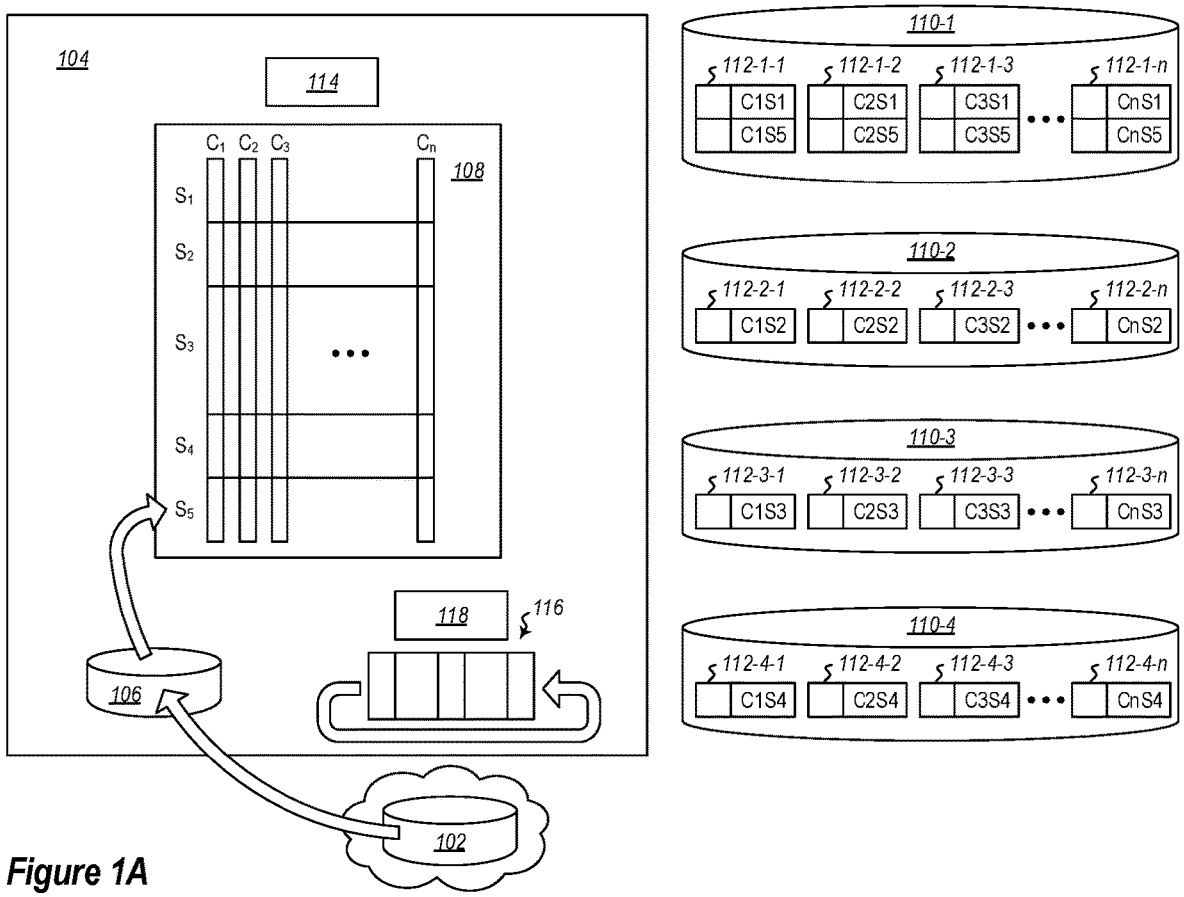
FIG. 1A illustrates a drive based database system that operates in a fashion similar to an in-memory database system.

Some embodiments described herein implement a database system using hard drives, such as solid state drives (SSDs) that will work well for column-oriented in-memory databases without changing much the in-memory architecture. Embodiments use a new, generation-based caching system that allows keeping essentially the same architecture as in-memory systems without sacrificing significant amounts of speed. In particular, by using a sequentially ordered series of different drives to sequentially store different segments, and by reading sufficiently large amounts of data into each drive to optimize drive controller reads, embodiments can achieve the maximum throughput of the drive rather than being limited by the number of Input/Output Operations per Second (IOPS) for the drives. This allows embodiments to keep the same or substantially similar memory specific speeds by having an architecture that allows combining paging and scaling the database out.

The improved system is implemented in a fashion that makes drives look, and in many cases, perform, like memory so that the architecture does not need to be drastically modified so that current performance characteristics are maintained. To accomplish this, embodiments may implement any or all of the following functionality: paging in full segments (which may be required by the column-oriented query engine) into a drive; using a buffer pool in which memory is allocated circularly (to avoid the overhead of "real" memory allocation); adjusting the scale-out algorithm to keep the same memory bandwidth as the original in-memory system; using a read-ahead of one segment to keep the data as warm as possible without exceeding the bufferpool.

In considering how to reduce costs for in-memory database systems, the following factors may be relevant:

- SSD latencies are small, pushing 100 k TOPS.
- SSD throughputs are good, and are approaching memory throughputs (500+ MB/s for SATA3 SSDs and 1500+ MB/s for PCIe SSD boards).
- SSDs are cheap (presently, typically $0.8/GB up to $2/GB).
- Memory is also cheap.
- Machines that can accommodate large amounts of memory (e.g. 2 TB) come in expensive form factors.
- Machines that can accommodate similar amounts of SSD storage space can be implemented in much less expensive form factors. For example, a typical Windows Azure™ compute node available from Microsoft Corporation of Redmond Wash. will have 120 GB of (usable) RAM but 2.4 TB of SSD storage.

In the example above, the machine can generally accommodate two orders of magnitude more SSD (or other disk) storage than memory, while the performance of memory is only within one order of the SSD speed. Furthermore, a machine may be implemented with a set of SSDs rather than a single SSD, and striping the access across the disks could result in a significant improvement over the performance of a single SSD.

The following illustrates experimental results validating the effectiveness of some of the embodiments described herein. The experiment was run on a (standard developer) Z420 machine with 1 processor E5-1650 @3.2 GHz, 24 GB RAM system available from Hewlett Packard Corporation of Palo Alto, Calif. The stock machine was equipped with a 2 TB SATA (rotational) disk with modest performance. Four 240 GB of OCZ RevoDrive 3 X2 drives were added. These are SSD boards that can be coupled on the PCIe interface and can deliver up to 1.5 GB/sec.

The simulated workload was characterized by a moderate number of large IOs (i.e. high 100 kBs to a few MBs). The results are presented in the table below:

| Experiment Description | Speed MB/s |
|---|---|
| 1 disk × 1 MB IOs, queue depth = 10 | 1610 |
| In parallel, 2 disks × 1 MB IOs, queue depth = 10 | 3190 |
| In parallel, 4 disks × 1 MB IOs, queue depth = 10 | 6210 |
| RAID0 disk of the 4 × 1 MB IOs, queue depth = 10 | 2850 |
| In parallel, 4 disks × 64 kB IOs, queue depth = 20, 50 | 3130 |
| In parallel, 4 disks × 128 kB IOs, queue depth = 10, 20 | 4120 |

As can be observed from the preceding experiment, as long as the physical bus permits, embodiments can achieve an acceptable bandwidth of the SSD hardware with a workload that might be implemented in a desired database system. Also, to achieve higher performance, a custom RAID0 system can be implemented rather than simply using an off the shelf RAID0 system. Further, performance is better if large IOs (i.e. IOs that are of significant size in comparison to drive controller capabilities) are performed at the SSDs, even if smaller queue depths are employed. For example, in many modern SSD drives or drive cards, there may be a desire to reach data transfer that approximates the specified throughput of the drive. Small reads from the drives will not approach these throughputs; however, large reads may. Thus, performing a group of 10×1 MB reads would result in a 10 MB read from a drive which would saturate the controller and cause the disk to perform at or near its specified throughput that is identified in the disk specification. Thus, disk reads, in some embodiments, may be some value above about 4 MB. However, reasonable performance can be achieved when reads are above 500 KB.

In implementing embodiments herein, several factors may contribute to the design. It is desirable to implement some embodiments with minimal changes compared to in-memory database systems. This may be important to protect the stability of a system as a whole which incorporates the database system into it.

Embodiments may implement disk paging into memory on top of a distributed on-disk caching structure. This allows for other portions of the system, such as storage, to remain the same. As illustrated below, embodiments create a caching structure on load and operate with the caching structure at query time.

When paging in, embodiments could choose to operate either with fixed size pages or with segments. A typical representative system in which the database may be used may have 16 processor cores, for a typical representative query involving about 6 columns that would need to be paged in such that in a cold page in, about 100 column segments would be paged in. Better performance can be achieved in some embodiments if whole segments will be paged in rather than individual pages. In particular, for some systems to work unmodified, a whole segment has to be available when the query starts. Thus, it may be more efficient to page in a whole segment. Further, issuing between high tens to low hundreds of larger outstanding IOs across multiple disks is more efficient than issuing thousands or IOs of thousands of smaller IOs. Additionally, paging in whole segments has also the advantage that the processing code stays largely unmodified. Embodiments that page in pages will need to make sure that runs get split (artificially) at page boundaries, which is a significant change in the processing pipeline As the sizes of the segments are large (up to 32 MB and typically around 2-4 MB, assuming a 10-15× compression ratio), embodiments may not be able to allocate system memory with each page-in operation, as it would delegate to expensive allocation procedures. Thus, as illustrated below, embodiments implement a buffer pool. To deal with fragmentation and different allocation sizes, embodiments may implement a ring buffer pool, as illustrated below, that operates in a circular fashion using pointers to keep track of free portions of the buffer pool rather than using fixed page sizes.

Further, some embodiments only page the data files of the subsegments, not the RLE runs, dictionaries, hierarchies, metadata, etc. This may be done as an optimization when paging dictionaries and hierarchies results in large amounts of work that will cause instability in the system.

Referring now to FIG. 1A, an example implementation is illustrated. In the example illustrated, data can be stored in cloud storage 102. For example, the cloud storage may be implemented using an Azure Blob Store available in Windows Azure™ system. Portions of data from the cloud storage 102 can be cached locally at a service 104 in a local database cache 106. Initially, portions of data from the local database cache 106 can be read into main memory into a table 108. From the table 108 in main memory, the data is scattered out to available drives at a segment level. A segment, as used herein, is a predetermined number of rows in a table. In some embodiments, a segment size may be a default of 8 million rows. However, this size is configurable and in some embodiments, not all segments are the same size. Rather, some embodiments allow for segments to be of different sizes. Returning now to the present example, the system 104 includes four drives 110-1 through 110-4. Four drives are illustrated in the example, but it should be appreciated that a different number of drives could be used in other embodiments.

When a model loads, data goes to the main memory only to be scattered at the segment level onto the n (in the illustrated example, n=4) SSD cache drives available. Then, the memory in the segment is freed and the segment remembers a handle (that a paging module can interpret appropriately) that has in the underlying structure, among other things, the file and offset for the data to be paged in.

When the data is paged out to the drives, embodiments create one file per column partition per drive location. Note that the file, in this particular embodiment, is per column, and not per segment. Thus, a given file may store several segments from a column. Illustratively, FIG. 1A illustrates that each of the drives 110-1 through 110-4 includes one file for each column in the table 110. For example, in FIG. 1A, a file 112-1-1 is included in the drive 110-1 for column C1 in the table 108. A file 112-2-1 in included in the drive 110-2 for column C1 in the table 108. A file 112-3-1 in included in the drive 110-3 for column C1 in the table 108. A file 112-4-1 in included in the drive 110-4 for column C2 in the table 108. FIG. 1A also illustrates files 112-1-2, 112-1-3 and 112-1-4 for columns C2, C3, and C4 in the table 108 respectively. Similar files are included in drives 110-2, 110-3 and 110-4 for those columns as well.

As segments are loaded, they are cached out to the n locations (again, in the illustrated example, n=4). Assuming N segments, for each column partition, there are n files, each with about N/n segments. The shuffling of the segments is round robin, in order to achieve parallelism during querying. For example, as illustrated in the example of FIG. 1A, there are 5 segments for each column. Using the round-robin paging out, the file 112-1-1 stores segment S1 from column C1. The file 112-2-1 stores segment S2 from column C1. The file 112-3-1 stores segment S3 from column C1. The file 112-4-1 stores segment S4 from column C1. The round robin algorithm continues and circles around such that the file 112-1-1 stores segment S5 from column C1. Similar actions are performed for the remaining columns in the table 108, but with different files at each drive for each different column. For example, FIG. 1A illustrates file 112-1-2 for column C2 in the table 108. Various other files are evident in FIG. 1A for the different columns and different drives.

An engine 114 can be implemented at the service 104 to handle the paging in/out. Additionally, as illustrated below, the engine 114 can handle overlapped IOs, buffer pool management and buffer pool caches.

When the server 104 starts, it also allocates a buffer pool 116. The buffer pool 116 is global per server. The size of the buffer pool 116 is configured according to pre-defined initialization settings. In some embodiments, a recommended buffer pool size is about 40% of the physical memory size. The buffer pool 116 is implemented as a ring buffer where the next storage address at the end of the buffer pool 116 is the first address in the buffer pool 110.

When a query executes, each job (that now handles an array of segments) will get an appropriate memory allocation out of the buffer pool 116, overlapped IOs will be spawned for all of the columns needed by the current segment of the job. In some embodiments, overlapped IOs will be spawned for all of the columns needed by the next segment of the job as well, as a look-ahead technique to keep data warm. In particular, one additional segment needed for a next portion of a job is read into the buffer pool 116 so that that data is warm. The job will block to wait on the IOs of the current segment. At the end of the segment query, the segment data is "freed", i.e. memory is returned to the buffer pool 116. The buffer pool is typically significantly larger than the typical instantaneous outstanding memory needs. The allocation/free technique of the buffer pool is as follows:

(1) If there is not sufficient memory in the buffer pool 116, embodiments can wait for a short period of time for memory in the buffer pool 116 to be freed up and made available.

(2) When returning memory to the buffer pool 116, the memory becomes available only when the free happens at the end of the (ring) buffer pool. If not, the actual availability is deferred to the moment of when the free at the end of the buffer pool is issued, which also triggers a garbage collect operation of the previously freed operations.

(3) To easily manage the buffer pool, internally, in the illustrated example, it is divided in 4 kB pages, but its API has to possibility of allocating contiguous ranges of pages, which is how embodiments herein allocate portions of the buffer pool 116. The division into 4 kB pages makes the management reasonable by providing direct access without too much overhead. A 50 GB buffer pool, for example, requires only 1 bit per 4 kB, meaning only about 1.5 MB of map (a 0.31% memory overhead).

Experimental results have shown that using the 1 segment look-ahead technique described above, embodiments are able to achieve about 99% of the potential bandwidth of about 6 GB/s on the Z420 machine considered above. In particular, the look-ahead technique gives the last 30% performance boost by insuring that, while the current (already paged in) segment is queried, the IO system works on paging in the next segment.

Embodiments may be implemented where not all tables are paged out to the drives. For example, in some embodiments, only sharded tables and/or smaller models are paged out to drives.

In some embodiments, even further improvements can be implemented. For example, in some embodiments an additional feature may be to have a hot list of the memory inside the buffer pool and an appropriate eviction mechanism. For example, a last recently used (LRU) eviction mechanism may be used. For example, as illustrated in FIG. 1A, embodiments may implement a second ring buffer 118 in main memory of a smaller size where hot memory gets promoted. Items in the second ring buffer 118 are not recycled as quickly, and thus remain available for longer periods of time. Count usage per configurable time or some other policy. May use approximate most recently used, least recently used.

A further enhancement in some embodiments is the ability to reuse invalidated data from the buffer pool 116. In particular, data may be invalidated in the buffer pool 116 after it has been accessed. Invalidating the data essentially indicates that the portion of the ring containing the data is available for use by new data being read into the buffer pool 116. However, so long as new data has not been moved into the memory for data that has been invalidated, the data can actually be reused until it is actually overwritten. Thus, so called "invalidated" data can be used nonetheless as if it were valid data.

Figure 1B:
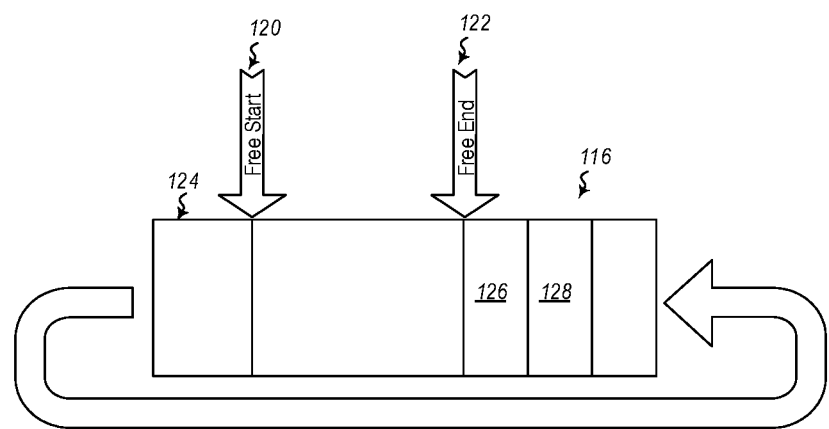
FIG. 1B illustrates additional details regarding reusing data from a ring buffer.

Referring now to FIG. 1B, and example is illustrated. FIG. 1B illustrates the ring buffer 116. As illustrated in FIG. 1B, two pointers can be used to indicate the portion 124 of the ring buffer 116 marked as free. The first pointer 120 marks where the free portion 124 of the ring buffer 116 starts and the second pointer 122 marks where the end of the free portion 124 of the ring buffer 116. When data has been read and used, the second pointer can be moved to a memory location past that data to indicate that that portion of the ring buffer 116 is now free. However, a subsequent search may wish to use some data that has already been read used and marked as free. So long as that data has not been overwritten, the data can be reused.

For example, assume in FIG. 1B that a subsequent search will use data such as that in the location labeled 126. The memory location is marked as free, but the data has not been overwritten. Thus the data in location 126 can be reused. This may be accomplished by moving the second pointer 122 back to the start of location 126 (i.e. the end of location 128) so that the location 126 is no longer marked as free. The data in location 126 can then simply be used as normal. Alternatively, the data in location 126 may be read from location 126 in the ring buffer 116 and rewritten to the beginning of the free portion 124. The first pointer 120 is moved as performed when reading from disk. While this may be slower than simply moving the second pointer 122, it is still faster than reading directly from disk. Further, as noted below, various considerations may be taken into account to determine whether the second pointer 122 should be moved, or if the data should be re-read, re-written and the first pointer 120 moved.

For example, consider if the data to be reused is stored in location 128. Rather than moving the pointer 122 back to the start of location 128, and un-necessarily un-freeing location 126, the data in location 128 can be read from location 128 of the ring buffer 116 and written into the start of the free portion 124. The first pointer 120 would then be moved passed the written data so that the written data would be in the active portion of the ring buffer 116. However, if the data to be re-used is in location 126, the second pointer 122 can be moved without re-capturing any unnecessary data so as to efficiently use the ring buffer.

In an alternative embodiment, a determination may be made as to how much unneeded data will be revalidated by unfreezing portions of the ring buffer 116 versus how much needed data will be revalidated by unfreezing portions of the ring buffer 116. This can affect whether the second pointer 122 is moved or whether the data is re-read (either from the ring buffer 116, or disk). For example, if moving the second pointer will result in 80% of the data revalidated being needed data and 20% being unneeded data, then embodiments may determine this to be sufficiently efficient and cause the second pointer 122 to be moved thus revalidating data at the end of the free portion 124. However, if moving the second pointer will result in 80% of the data revalidated being unneeded data and 20% being needed data, then embodiments may determine this to not be sufficiently efficient and will instead reread the needed data, either from the ring buffer 116 or from one of the drives 110.

The following discussion now refers to a number of methods and method acts that may be performed. Although the method acts may be discussed in a certain order or illustrated in a flow chart as occurring in a particular order, no particular ordering is required unless specifically stated, or required because an act is dependent on another act being completed prior to the act being performed.

Figure 2:
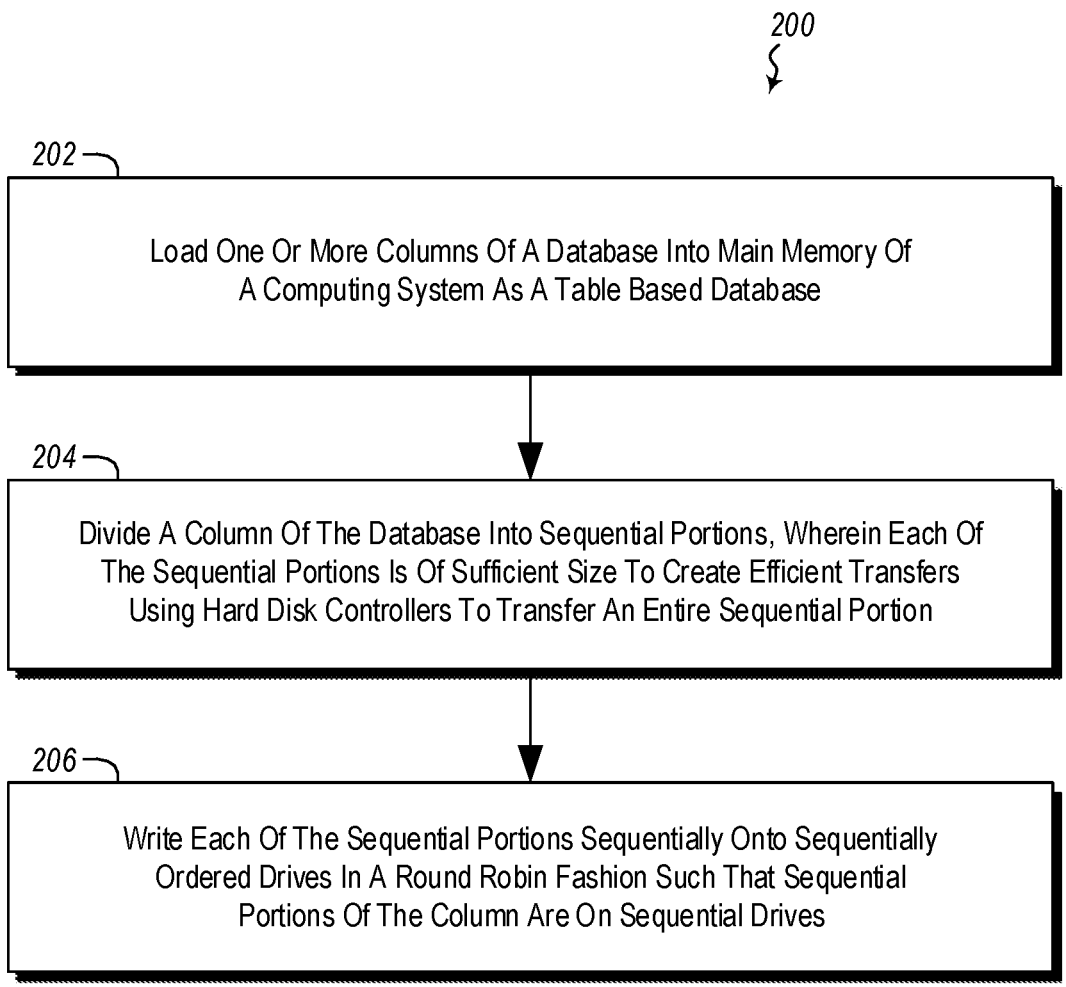
FIG. 2 illustrates a method of implementing a database system using a plurality of sequentially ordered drives to store sequential portions of columns of the database.

Referring now to FIG. 2, a method 200 is illustrated. The method 200 may be practiced in a computing environment. The method 200 includes acts for implementing a database system using a plurality of sequentially ordered drives to store sequential portions of columns of the database. The database system is usable by a system configured for use with in-memory database systems. The method includes loading one or more columns of a database into main memory of a computing system as a table based database (act 202). For example, as illustrated in FIG. 1A, database data may be loaded from cloud storage 102 into a local database cache 106 and then loaded into a table 108 implemented in main memory of the system 104.

The method 200 may further include dividing a column of the database into sequential portions (act 204). The sequential portions are generally of sufficient size to create efficient transfers using hard disk controllers to transfer an entire sequential portion. Thus, as illustrated in FIG. 1A, each of the columns is divided into segments. The segments are generally sufficiently large enough to be significant to the drives 110-1 through 110-4. As illustrated above, using current SSD or disk card storage, reads of about 4 GB may be sufficiently large. Some embodiments can even perform acceptably using reads as low as about 500 KB.

The method 200 further includes writing each of the sequential portions sequentially onto sequentially ordered drives in a round robin fashion such that sequential portions of the column are on sequential drives (act 206). This is illustrated in FIG. 1A which illustrates drives 110-1 through 11-4 ordered sequentially each with a file where each file on each sequential drive stores a sequential segment. Further, as described above, the segments are stored in a round robin fashion. Thus, in the illustrated example, file 112-1-1 stores segment 1 from column 1 and segment 5 from column 1 because it is, in a round robin sequence, next after the file 112-4-1.

As illustrated in various examples above, the method 200 may be practiced where each of the sequentially ordered drives is an SSD drive.

As illustrated in the example in FIG. 1A, the method 200 may be practiced where each of the sequential portions is a segment.

The method 200 may be practiced where each of the drives stores database data on a file per column basis such that each drive has a single data file for a given column of the database irrespective of how many portions of a column are stored at a given drive. FIG. 1A illustrates an example of this where each drive includes a file for each of the n columns.

Similarly, the method 200 may further include, for one or more other columns, repeating the acts of dividing a column of the database into sequential portions and writing each of the sequential portions sequentially onto sequentially ordered drives in a round robin fashion.

The method 200 may further include, reading sequential portions from the drives into a ring buffer. The ring buffer is implemented in the main memory of the computing system. An example is illustrated above where portions are read into the ring buffer 116 from the drives 110-1 through 110-4. In particular, portions can be simultaneously read from the different drives 110-1 through 110-4 into different portions of the ring buffer 116. Operations can then be performed on the data in the ring buffer 116. Some embodiments may determine that certain data from in the ring buffer is hot data in that the data has a predetermined frequency of reuse. As a result, embodiments may include transferring the certain data to another buffer implemented in the main memory of the computing system. For example, as illustrated in FIG. 1A, heavily used data from the buffer 116 can be moved to the buffer 118.

Figure 3:
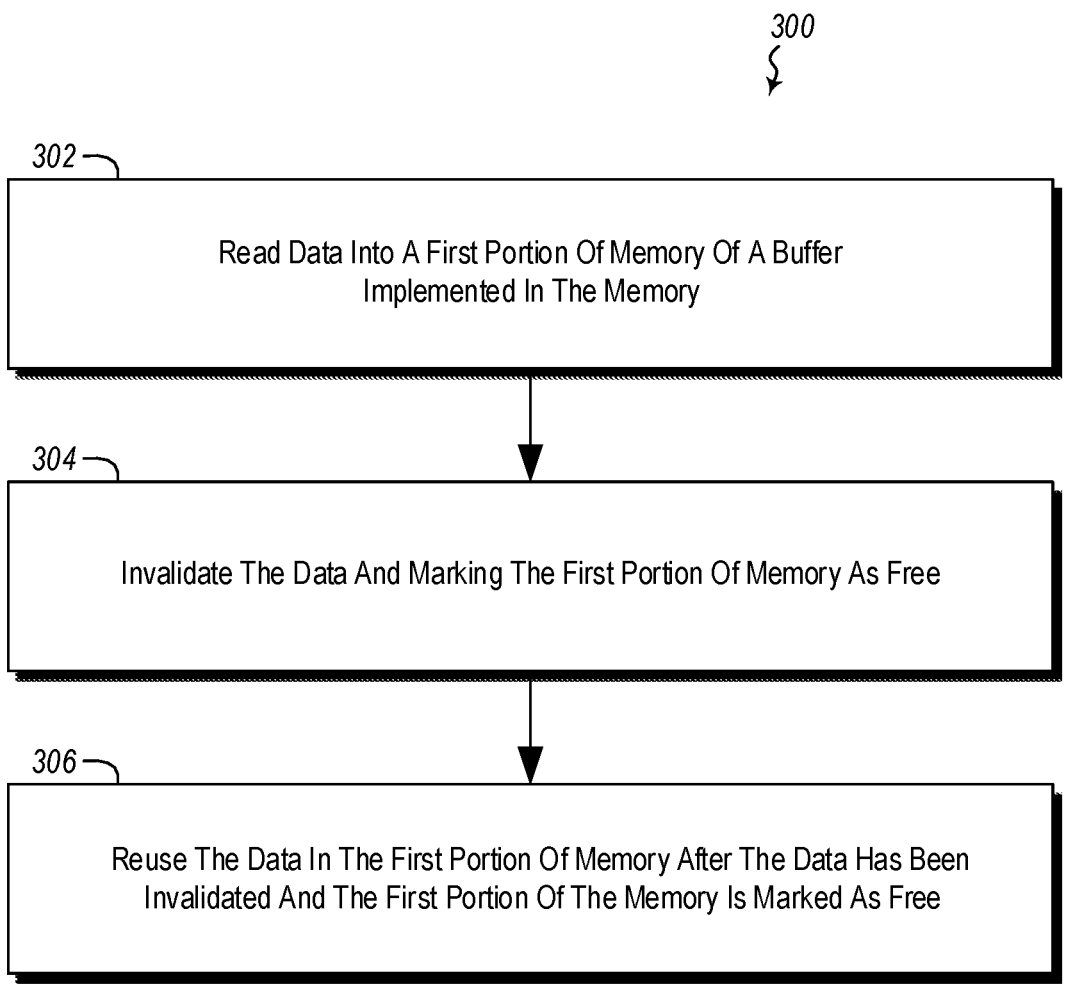
FIG. 3 illustrates a method for reusing data in a buffer.

Referring now to FIG. 3, a method 300 is illustrated. The method 300 may be practiced in a computing environment. The method 300 includes acts for reusing data in a memory buffer. The method 300 includes reading data into a first portion of memory of a buffer implemented in the memory (act 302). For example, in FIG. 1A, data may be read from a drive 110-1 into the ring buffer 116.

The method 300 may further include invalidating the data and marking the first portion of memory as free (act 304). Thus, the first portion of memory is marked as being usable for storing other data, but where the data is not yet overwritten. For example, the location 126 may be marked as a free portion by moving the pointer 122 to the end of the location 126.

The method 300 includes reusing the data in the first portion of memory after the data has been invalidated and the first portion of the memory is marked as free (act 306). Thus, in the illustrated example, data can be used from the location 126 even though that data had been invalidated by the location 126 being marked as free.

The method 300 may be practiced where reusing the data in the first portion of memory comprises unmarking the first portion of memory so that the first portion of memory is no longer marked as free. Thus, for example, the pointer 122 could be moved to the end of location 128 thus revalidating the data in location 126. The method 300 may be practiced where the first portion of memory is unmarked based on a determination of the position of the first portion of memory with respect to other portions of free memory in the buffer. Thus, for example, since the location 126 is at the end of the free portion 124 of the buffer 116, it may be a simple task to simply move the pointer 122. However, if the portion in question was at location 128, then a determination may be made to not move the pointer 122 and instead either read the data from the portion 128 and rewrite it to the buffer or to read the data from disk 110 and rewrite it to the buffer.

The method 300 may be practiced where the first portion of memory is unmarked based on a determination that unmarking the first portion of memory will not cause a predetermined amount of other data to be revalidated where the other data is data not intended to be reused. Thus, for example, if the data to be reused is in location 128 moving the pointer to the beginning of location 128 will not cause too much unneeded data (i.e. the data in location 126) to be revalidated, then a determination may be made that it is acceptable to move the pointer 122.

The method 300 may be practiced where reusing the data in the first portion of memory comprises reading the data from the first portion of memory that has been marked as free and writing the data to a different portion of the buffer. Thus, as illustrated above, in some embodiments, data in location 126 may be reused by re-reading the data from location 126 and writing it to a different portion of the buffer 116, such as the beginning of the free portion 124, and moving the first pointer 120 to a location after the rewritten data. In some such embodiments, the data is read from the first portion of memory that has been marked as free and written to a different portion of the buffer based on a determination of the position of the first portion of memory with respect to other portions of free memory in the buffer. Thus in the illustrated example, it may be more efficient to read data from location 128 and rewrite the data rather than moving the pointer 122. As discussed above, the data may be read from the first portion of memory that has been marked as free and written to a different portion of the buffer based a determination that unmarking the first portion of memory will cause a predetermined amount of other data to be revalidated where the other data is data not intended to be reused and thus reading and rewriting the data is more efficient than unmarking the first portion as free.

The method 300 may be practiced where the buffer is a ring buffer.

Further, the methods may be practiced by a computer system including one or more processors and computer readable media such as computer memory. In particular, the computer memory may store computer executable instructions that when executed by one or more processors cause various functions to be performed, such as the acts recited in the embodiments.

Embodiments of the present invention may comprise or utilize a special purpose or general-purpose computer including computer hardware, as discussed in greater detail below. Embodiments within the scope of the present invention also include physical and other computer-readable media for carrying or storing computer-executable instructions and/or data structures. Such computer-readable media can be any available media that can be accessed by a general purpose or special purpose computer system. Computer-readable media that store computer-executable instructions are physical storage media. Computer-readable media that carry computer-executable instructions are transmission media. Thus, by way of example, and not limitation, embodiments of the invention can comprise at least two distinctly different kinds of computer-readable media: physical computer readable storage media and transmission computer readable media.

Physical computer readable storage media includes RAM, ROM, EEPROM, CD-ROM or other optical disk storage (such as CDs, DVDs, etc), magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry or desired program code means in the form of computer-executable instructions or data structures and which can be accessed by a general purpose or special purpose computer. Combinations of the above are also included within the scope of computer-readable media.

Further, upon reaching various computer system components, program code means in the form of computer-executable instructions or data structures can be transferred automatically from transmission computer readable media to physical computer readable storage media (or vice versa). For example, computer-executable instructions or data structures received over a network or data link can be buffered in RAM within a network interface module (e.g., a "NIC"), and then eventually transferred to computer system RAM and/or to less volatile computer readable physical storage media at a computer system. Thus, computer readable physical storage media can be included in computer system components that also (or even primarily) utilize transmission media.

Computer-executable instructions comprise, for example, instructions and data which cause a general purpose computer, special purpose computer, or special purpose processing device to perform a certain function or group of functions. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the invention may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, pagers, routers, switches, and the like. The invention may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Alternatively, or in addition, the functionally described herein can be performed, at least in part, by one or more hardware logic components. For example, and without limitation, illustrative types of hardware logic components that can be used include Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs), etc.

The present invention may be embodied in other specific forms without departing from its spirit or characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. In a computing environment, a database system using a plurality of sequentially ordered drives to store sequential portions of columns of the database, but where the database system is usable by a system configured for use with in-memory database systems, the system comprising:
   one or more processors;
   a plurality of sequentially ordered drives;
   main memory; and
   one or more computer readable media, wherein the one or more computer readable media comprise computer executable instructions that are executable by at least one of the one or more processors to cause at least one of the one or more processors to perform the following:
      load one or more columns of a database into main memory of a computing system as a table based database;
      divide a column of the database into sequential portions;
      write each of the sequential portions sequentially onto sequentially ordered drives such that sequential portions of the column are on sequential drives such that queries of a plurality of the sequential portions of the column can be performed in parallel;
      read at least some of the sequential portions from the drives into a ring buffer; and
      upon determining that certain data from in the ring buffer is hot data that has a predetermined frequency of reuse, transfer the hot data to another buffer.

2. The database system of claim 1, wherein each of the sequentially ordered drives is an SSD drive.

3. The database system of claim 1, wherein each of the sequential portions is a segment.

4. The database system of claim 1, wherein each of the drives stores database data on a file per column basis such that each drive has a single data file for a given column of the database irrespective of how many portions of a column are stored at a given drive.

5. The database system of claim 1, wherein the computer executable instructions are further executable by at least one of the one or more processors to cause at least one of the one or more processors to:
   for one or more other columns, divide a column of the database into sequential portions and write each of the sequential portions sequentially onto sequentially ordered drives.

6. The database system of claim 1, wherein the ring buffer is implemented in the main memory.

7. The database system of claim 6, wherein said another buffer is implemented in the main memory of the computing system.

8. The database system of claim 1, wherein said another buffer is smaller than the ring buffer.

9. The database system of claim 1, wherein items in said another buffer are recycled at a slower rate than items in the ring buffer.

* * * * *